(12) United States Patent
Huang et al.

(10) Patent No.: US 9,065,336 B2
(45) Date of Patent: Jun. 23, 2015

(54) MAXIMUM POWER POINT TRACKING METHOD AND APPARATUS

(71) Applicant: Industrial Technology Research Institute, Hsinchu (TW)

(72) Inventors: Chao-Jen Huang, Taichung (TW); Fang-Chih Chu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 13/965,214

(22) Filed: Aug. 13, 2013

(65) Prior Publication Data

US 2015/0002127 A1    Jan. 1, 2015

(30) Foreign Application Priority Data

Jun. 26, 2013    (TW) .............................. 102122756 A (51) Int. Cl.
*H02M 3/156* (2006.01)
*H02M 3/158* (2006.01)
*G05F 1/67* (2006.01)
*H02J 3/38* (2006.01)
*H02M 1/00* (2007.01)

(52) U.S. Cl.
CPC ............... *H02M 3/158* (2013.01); *G05F 1/67* (2013.01); *H02J 3/385* (2013.01); *H02M 2001/0025* (2013.01)

(58) Field of Classification Search
CPC ....... H02M 3/155; H02M 3/156; Y02E 10/58
USPC .................. 323/222, 282, 284, 285, 351, 906
See application file for complete search history.

(56) References Cited

U.S. PATENT DOCUMENTS

| 2,290,784 | A | 7/1942 | Turpin |
| 2,527,949 | A | 10/1950 | Maier et al. |
| 4,580,090 | A | 4/1986 | Bailey et al. |
| 5,801,519 | A | 9/1998 | Midya et al. |

(Continued)

FOREIGN PATENT DOCUMENTS

| CN | 101253461 | 8/2008 |
| CN | 101397153 | 4/2009 |

(Continued)

OTHER PUBLICATIONS

"Notice of Allowance of Taiwan Counterpart Application", issued on Nov. 28, 2014, p. 1-p. 4, in which the listed references were cited.

(Continued)

*Primary Examiner* — Gary L Laxton
(74) *Attorney, Agent, or Firm* — Jianq Chyun IP Office (57) ABSTRACT

A maximum power point tracking (MPPT) apparatus and a MPPT method are disclosed. A converter uses an inductor therein to perform power conversion operations according to a gating signal so as to convert an input electrical energy into an output electrical energy to a load. A controller monitors the voltage difference of the inductor and the element temperature, performs a lookup table operation or calculates the element characteristic according to the element temperature, and further uses the element characteristic and the voltage difference of the inductor for calculating a characteristic value and correspondingly adjusts the gating signal according to the characteristic value so as to track the power of the input electrical energy.

40 Claims, 7 Drawing Sheets

(56) References Cited

U.S. PATENT DOCUMENTS

| | | | |
|---|---|---|---|
| 5,867,011 A | 2/1999 | Jo et al. | |
| 6,255,804 B1 | 7/2001 | Herniter et al. | |
| 6,844,739 B2 | 1/2005 | Kasai et al. | |
| 6,919,714 B2 | 7/2005 | Delepaut | |
| 6,954,054 B2* | 10/2005 | Brown | 323/283 |
| 6,984,970 B2 | 1/2006 | Capel | |
| 7,158,395 B2 | 1/2007 | Deng et al. | |
| 7,256,566 B2 | 8/2007 | Bhavaraju et al. | |
| 7,825,642 B1* | 11/2010 | Young et al. | 323/224 |
| 7,883,808 B2 | 2/2011 | Norimatsu et al. | |
| 7,991,511 B2 | 8/2011 | Zhang et al. | |
| 7,993,768 B2 | 8/2011 | Vallance et al. | |
| 7,994,768 B2 | 8/2011 | Park | |
| 8,004,232 B2 | 8/2011 | Schultz | |
| 8,093,756 B2 | 1/2012 | Porter et al. | |
| 8,093,873 B2 | 1/2012 | Kiamilev et al. | |
| 8,139,382 B2 | 3/2012 | Zhang et al. | |
| 8,164,317 B2* | 4/2012 | Chiu | 323/283 |
| RE43,719 E | 10/2012 | Leonhardt et al. | |
| 8,279,644 B2 | 10/2012 | Zhang et al. | |
| 8,339,112 B2 | 12/2012 | Rua et al. | |
| 8,659,188 B2* | 2/2014 | Adest et al. | 307/117 |
| 2008/0111517 A1 | 5/2008 | Pfeifer et al. | |
| 2009/0284998 A1 | 11/2009 | Zhang et al. | |
| 2010/0219690 A1 | 9/2010 | Femia et al. | |
| 2011/0001360 A1 | 1/2011 | Rua' et al. | |
| 2011/0227525 A1 | 9/2011 | Blackall et al. | |
| 2012/0043818 A1 | 2/2012 | Stratakos et al. | |
| 2012/0043823 A1 | 2/2012 | Stratakos et al. | |
| 2012/0081934 A1 | 4/2012 | Garrity et al. | |
| 2012/0133346 A1* | 5/2012 | Ogawa et al. | 323/282 |

FOREIGN PATENT DOCUMENTS

| | | |
|---|---|---|
| CN | 100498636 | 6/2009 |
| CN | 101694676 | 4/2010 |
| CN | 101706073 | 5/2010 |
| CN | 101777777 | 7/2010 |
| CN | 101924376 | 12/2010 |
| CN | 102111086 | 6/2011 |
| CN | 102118432 | 7/2011 |
| CN | 102148507 | 8/2011 |
| CN | 102156408 | 8/2011 |
| CN | 102272687 | 12/2011 |
| CN | 102291050 | 12/2011 |
| CN | 102314190 | 1/2012 |
| CN | 102331808 | 1/2012 |
| CN | 102354110 | 2/2012 |
| CN | 102386808 | 3/2012 |
| CN | 102545339 | 7/2012 |
| CN | 102545703 | 7/2012 |
| CN | 102622034 | 8/2012 |
| CN | 102681589 | 9/2012 |
| CN | 102710164 | 10/2012 |
| EP | 1938439 | 7/2008 |
| EP | 2396821 | 12/2011 |
| EP | 2422255 | 2/2012 |
| EP | 2538300 | 12/2012 |
| JP | 06-202745 | 7/1994 |
| JP | 2004240552 | 8/2004 |
| JP | 2006039634 | 2/2006 |
| JP | 2007095617 | 4/2007 |
| JP | 2009207239 | 9/2009 |
| JP | 4591741 | 12/2010 |
| TW | 293964 | 12/1996 |
| TW | I232361 | 5/2005 |
| TW | 200723665 | 6/2007 |
| TW | I328730 | 8/2010 |
| TW | 201042416 | 12/2010 |
| TW | 201100995 | 1/2011 |
| TW | 201104380 | 2/2011 |
| TW | 201116966 | 5/2011 |
| TW | 201140276 | 11/2011 |
| TW | 201214078 | 4/2012 |
| TW | 201214079 | 4/2012 |
| TW | I364898 | 5/2012 |
| TW | 201237587 | 9/2012 |
| TW | 201250428 | 12/2012 |
| TW | I379183 | 12/2012 |
| TW | I381263 | 1/2013 |
| TW | I382646 | 1/2013 |
| TW | I383283 | 1/2013 |
| TW | 201315116 | 4/2013 |
| WO | 2011109746 | 9/2011 |

OTHER PUBLICATIONS

Nabulsi et al., "Efficiency Optimization of a DSP-Based Standalone PV System Using Fuzzy Logic and Dual-MPPT Control," IEEE Transactions on Industrial Informatics 8 (3), Aug. 2012, pp. 573-584.

Latham et al., "Analysis and Optimization of Maximum Power Point Tracking Algorithms in the Presence of Noise," IEEE Transactions on Power Electronics 28 (7), Jul. 2013, pp. 3479-3494.

Alajmi et al., "Fuzzy-Logic-Control Approach of a Modified Hill-Climbing Method for Maximum Power Point in Microgrid Standalone Photovoltaic System," IEEE Transactions on Power Electronics 26 (4), Apr. 2011, pp. 1022-1030.

Villiers, "Hybrid Energy Harvesting System for a Condition Monitoring Mote," Master's thesis, Jun. 2009, Department of Electrical Engineering, Cape Peninsula University of Technology.

Ward et al., "Power Generation Report," Energy Efficient VEhicles for Road Transport (EE-VERT), Dec. 23, 2009, pp. 1-88.

Brunelli, "Electronics Systems for Ambient Intelligence," Master's thesis, Mar. 2007, Department of Electronics, Computer Science and Systems, University of Bologna.

Bianconi et al., "A Fast Current-Based MPPT Technique Employing Sliding Mode Control," IEEE Transactions on Industrial Electronics 60 (3), Mar. 2013, pp. 1168-1178.

Koutroulis et al., "A New Technique for Tracking the Global Maximum Power Point of PV Arrays Operating Under Partial-Shading Conditions," IEEE Journal of Photovoltaics 2(2), Apr. 2012, pp. 184-190.

Zhang et al., "Development of a Novel Hybrid Maximum Power Point Tracking Methodology for Photovoltaic Systems," International Conference on Automation and Computing (ICAC), Sep. 8, 2012, pp. 1-6.

Kish et al., "Modelling and control of photovoltaic panels utilising the incremental conductance method for maximum power point tracking," IET Renewable Power Generation 6 (4), Jul. 2012, pp. 259-266.

Shao et al., "Maximizing the Harvested Energy for Micro-power Applications through Efficient MPPT and PMU Design," Proceedings of the 2010 Asia and South Pacific Design Automation Conference (ASPDAC '10), Jan. 18-21, 2010, pp. 75-80.

Laird et al., "High Step-Up DC/DC Topology and MPPT Algorithm for Use With a Thermoelectric Generator," IEEE Transactions on Power Electronics 28 (7), Jul. 2013, pp. 3147-3157.

Vieira et al., "Thermoelectric Generator Using Water Gas Heater Energy for Battery Charging," 18th IEEE International Conference on Control Applications (CCA) & Intelligent Control (ISIC), Jul. 8-10, 2009, pp. 1477-1482.

Eliasson, "Low-Power Design Methodologies for Embedded Internet Systems," Master's thesis, Mar. 2008, Department of Computer Science and Electronics Engineering, Luleå University of Technology.

Straten, "Energy Management System for a Wireless Indoor Climate Sensor," End Project Thesis, Jun. 8, 2012, Department of Electronical Engineering, Delft University of Technology.

Vieira et al., "Maximum Power Point Tracker Applied in Batteries Charging with Photovoltaic Panels," Solar Collectors and Panels, Theory and Applications, Oct. 2010, pp. 211-224.

Jessen et al., "Design Considerations for a Universal Smart Energy Module for Energy Harvesting in Wireless Sensor Networks," Proceedings of the Ninth Workshop on Intelligent Solutions in Embedded Systems (WISES), Jul. 7-8, 2011, pp. 35-40.

(56) References Cited

OTHER PUBLICATIONS

Fazeli et al., "Novel Maximum Power Point Tracking with Classical Cascaded Voltage and Current Loops for Photovoltaic Systems," IET Conference on Renewable Power Generation, Sep. 6-8, 2011, pp. 1-5.

Ali, "Design Considerations of Harvested-Energy Management," PhD's thesis, May 2012, Electronics and Computer Science, University of Southampton.

Enne et al., "A Maximum Power-Point Tracker without Digital Signal Processing in 0.35um CMOS for Automotive Applications," IEEE International Solid-State Circuits Conference, Feb. 20, 2012, pp. 102-104.

Kim et al., "Analysis and Design of Maximum Power Point Tracking Scheme for Thermoelectric Battery Energy Storage System," IEEE Transactions on Industrial Electronics 56 (9), Sep. 2009, pp. 3709-3716.

Bandyopadhyay et al., "Platform Architecture for Solar, Thermal and Vibration energy combining with MPPT and single inductor," Symposium on VLSI Circuits Digest of Technical Papers, Jun. 15-17, 2011, pp. 238-239.

Bandyopadhyay et al., "Platform Architecture for Solar, Thermal and Vibration Energy Combining with MPPT and Single Inductor," IEEE Journal of Solid-State Circuits 47 (9), Sep. 2012, pp. 2199-2215.

Kim et al., "An Effective POS MPPT Control Method for PV Power Generation System," IEEE International Conference on Electrical Machines and Systems, Nov. 15-18, 2009, pp. 1-6.

Kim et al., "Photovoltaic Maximum Power Point Tracking without Current Sensor for Module Integrated Converter," International Conference on Electrical Machines and Systems (ICEMS), Aug. 20-23, 2011, pp. 1-5.

Chun et al., "Analysis of Classical Root-Finding Methods Applied to Digital Maximum Power Point Tracking for Sustainable Photovoltaic Energy Generation," IEEE Transactions on Power Electronics 26 (12), Dec. 2011, pp. 3730-3743.

Andrejasic et al., "Comparison of direct maximum power point tracking algorithms using EN 50530 dynamic test procedure," IET Renewable Power Generation 5 (4), Jul. 2011, pp. 281-286.

Ramadass et al., "A Battery-Less Thermoelectric Energy Harvesting Interface Circuit With 35 mV Startup Voltage," Journal of Solid-State Circuits 46 (1), Jan. 2011, pp. 333-341.

Qiu et al., "5uW-to-10mW Input Power Range Inductive Boost Converter for Indoor Photovoltaic Energy Harvesting with Integrated Maximum Power Point Tracking Algorithm," IEEE International Solid-State Circuits Conference, Feb. 21, 2011, pp. 118-120.

Yang et al., "A Modified P&O MPPT Control of Photovoltaic Systems," International Conference on Electrical Machines and Systems (ICEMS), Aug. 20-23, 2011, pp. 1-3.

\* cited by examiner

FIG. 12

MAXIMUM POWER POINT TRACKING METHOD AND APPARATUS

CROSS-REFERENCE TO RELATED APPLICATION

This application claims the priority benefit of Taiwan application serial no. 102122756, filed on Jun. 26, 2013. The entirety of the above-mentioned patent application is hereby incorporated by reference herein and made a part of this specification.

TECHNICAL FIELD

The technical field generally relates to a maximum power point tracking (MPPT) method and a MPPT apparatus.

BACKGROUND

In recent years, along with the increasing awareness of renewable energy, some topics, in particular, the thermoelectric generator (TEG) and the energy harvesting (EH) have become hot research subjects today. For example, based on the trends that the oil will be running out soon and the expensive oil prices, the automotive industry has proposed an issue of enhancing the fuel efficiency one after another. Due to the poor efficiency of the internal combustion engine, about 40% of the oil combusted energy is converted to waste heat expelled, so if the waste heat can be used by recycling through thermoelectric materials, it will be able to improve fuel efficiency up to 8%. It should be noted that the vehicle type thermoelectric generator has an output energy in low voltage and high current form, such as 6 volts and 100 amps.

Figure 1:
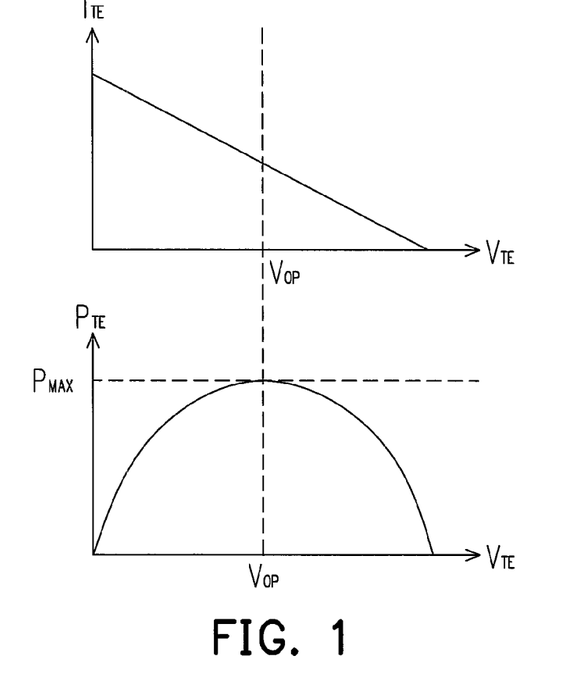
FIG. 1 is a schematic diagram illustrating a characteristic curve of the output current vs. the output voltage and a characteristic curve of the output power vs. the output voltage of a TE energy source (TEG harvester).

Many energy sources have with the maximum power point (MPP) characteristic, for example, FIG. 1 shows a characteristic curve of the output current vs. the output voltage of a thermoelectric (TE) energy source (e.g. TEG) and a characteristic curve of the output power vs. the output voltage of a TE energy source (e.g. TEG). In the upper part of FIG. 1, the abscissa represents output voltage $V_{TE}$ of the TE energy source and the ordinate represents output current $I_{TE}$ of the TE energy source; in the lower part of FIG. 1, the abscissa represents output voltage $V_{TE}$ of the TE energy source and the ordinate represents output power $P_{TE}$ of the TE energy source. It can be seen from FIG. 1 that the larger the output current $I_{TE}$ of the TE energy source, the smaller the output voltage $V_{TE}$ thereof is. When the output voltage $V_{TE}$ of the TE energy source is set at an operation voltage $V_{OP}$ shown by FIG. 1, the output power $P_{TE}$ achieves the maximum power value $P_{MAX}$ (i.e., the MPP).

Figure 2:
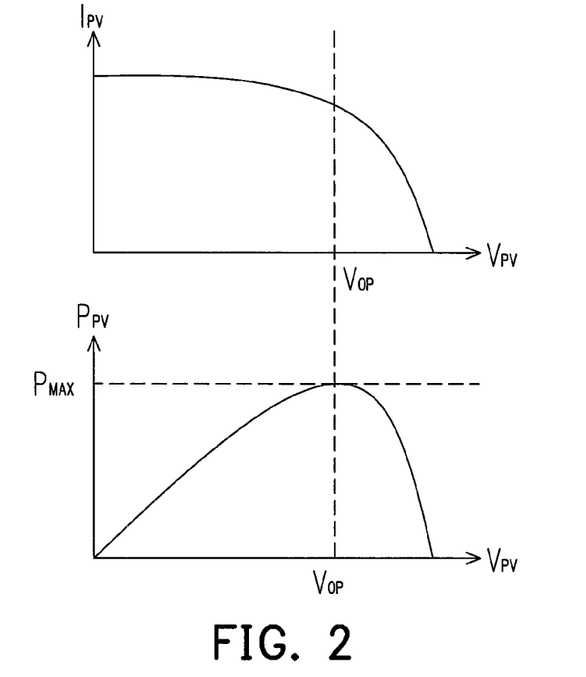
FIG. 2 is a schematic diagram illustrating a characteristic curve of the output current vs. the output voltage and a characteristic curve of the output power vs. the output voltage of a PV cell.

Another example is given by FIG. 2 wherein a characteristic curve of the output current vs. the output voltage of a photovoltaic cell (PV cell) and a characteristic curve of the output power vs. the output voltage of a PV cell are illustrated. In the upper part of FIG. 2, the abscissa represents output voltage $V_{PV}$ of the PV cell and the ordinate represents output current $I_{PV}$ of the PV cell; in the lower part of FIG. 1, the abscissa represents output voltage $V_{PV}$ of the PV cell and the ordinate represents output power $P_{PV}$ of the PV cell. It can be seen from FIG. 2 that the larger the output current $I_{PV}$ of the PV cell, the smaller the output voltage $V_{PV}$ thereof is. When the output voltage $V_{PV}$ of the PV cell is set at an operation voltage $V_{OP}$ shown by FIG. 1, the output power $P_{PV}$ achieves the maximum power value $P_{MAX}$ (i.e., the MPP).

During employing and operating an energy source with the MPP characteristic, it is needed to track the power point on the output of the energy source to advance the power-generating efficiency.

SUMMARY

A maximum power point tracking method (MPPT method) of the disclosure includes following steps: performing a power conversion operation by a converter through an inductor inside the converter according to a gating signal so as to convert an input electrical energy supplied by an energy source into an output electrical energy feeding to a load; sensing an operation temperature of the converter; obtaining at least one element characteristic according to the operation temperature so as to use the at least one element characteristic to monitor a voltage difference of the inductor; calculating a characteristic value according to the voltage difference of the inductor; and correspondingly adjusting the gating signal according to the characteristic value so as to track power of the input electrical energy of the energy source.

A maximum power point tracking apparatus (MPPT apparatus) of the disclosure includes a converter, a temperature sensor and a controller. The converter is configured to perform a power conversion operation through an inductor inside the converter according to a gating signal so as to convert an input electrical energy supplied by an energy source into an output electrical energy feeding to a load. The temperature sensor is configured to sense an operation temperature of the converter. The controller is coupled to the converter to provide the gating signal and coupled to the temperature sensor to obtain the operation temperature, wherein the controller obtains at least one element characteristic according to the operation temperature so as to use the at least one element characteristic to monitor a voltage difference of the inductor, and the controller calculates a characteristic value according to the voltage difference of the inductor and correspondingly adjusts the gating signal according to the characteristic value so as to track power of the input electrical energy of the energy source.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Note that some of expression words in whole the description of the disclosure (including the scope of claims) have certain interpretations. For example, term 'coupling' can mean direct or indirect connection means, that is, if it is stated in the text that 'the first device is coupled to the second device', it should be interpreted as the first device can be directly connected to the second device or the first device can be indirectly connected to the second device through other devices or certain connection means. Reference will now be made in detail to the embodiments of the disclosure, examples of which are illustrated in the accompanying drawings. Wherever possible, the same reference numbers for components/parts/steps are used in the drawings and the description to refer to the same or like parts. The components/parts/steps using the same notations or the same terminologies in different embodiments can be inter-referred to each other.

Figure 3:
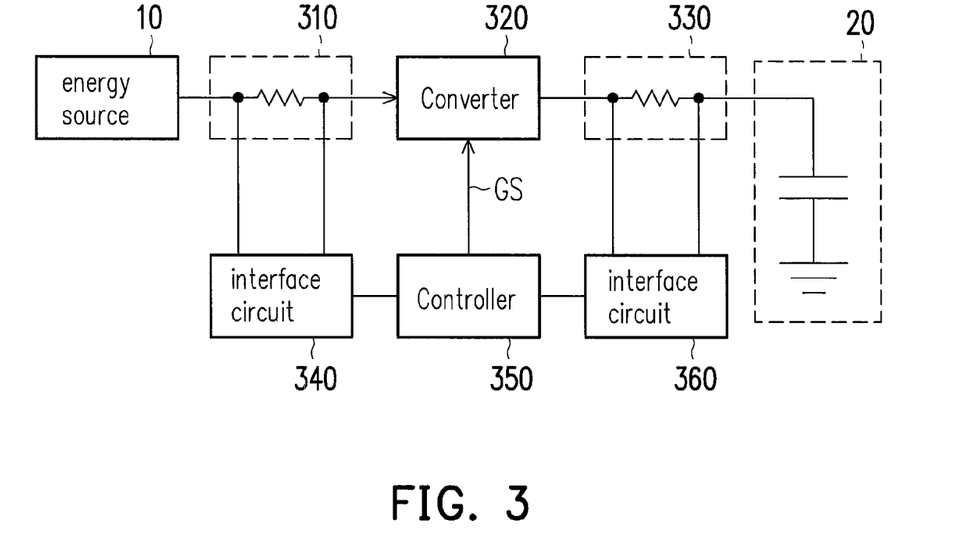
FIG. 3 is a block diagram of an exemplary circuit of a MPPT apparatus.

FIG. 3 is a block diagram of an exemplary circuit of a MPPT apparatus. The MPPT apparatus herein includes a current sensor 310, a converter 320, a current sensor 330, an interface circuit 340, a controller 350 and an interface circuit 360. The converter 320 can be a DC-DC converter or other power converters. For example, the converter 320 can be a boost converter, a buck converter, a buck-boost converter, a flyback converter, a SEPIC converter or a CÚk converter. The converter 320 uses an inductor inside the converter 320 to perform a power conversion operation according to a gating signal GS of the controller 350 so as to convert an input electrical energy provided by an energy source 10 into an output electrical energy to a load 20. For example, the converter 320 can charge a battery by using the output electrical energy.

The energy source 10 can refer to FIG. 1 or 2 to get understanding. The energy source 10 has an MPP characteristic and includes, for example, a PV cell or a TE energy. The controller 350 requires a current sensor 310 and an interface circuit 340 for monitoring the output current of the energy source 10 (i.e., the input current of the converter 320). The current sensor 310 can be a sensing resistor, a Hall component or a transformer so as to sense the amount of output current of the energy source 10. The interface circuit 340 is able to convert the sensing result of the current sensor 310 into a current information required by the controller 350. In this way, the controller 350 is able to track the MPP of the energy source 10 according to the output current information of the energy source 10.

On the other hand, the controller 350 requires another current sensor 330 and another interface circuit 360 for monitoring the output current of the converter 320. The current sensor 330 can sense the output current amount of the converter 320 and the interface circuit 360 can convert the sensing result of the current sensor 330 into a required current information of the controller 350. As a result, the controller 350 can control the charging operation on the battery (load 20) according to the output current information of the converter 320.

It can be seen from FIG. 3 that in order to sense the current information, the additional current sensors 310 and 330 are used, however, the current sensors 310 and 330 lead to the loss of energy efficiency and increasing cost. Therefore, multiple embodiments about the maximum MPPT scheme without current sensors are described in follows according to the disclosure, and these embodiments are suitable for MPPT for collecting energy such as photoelectric energy, TE, etc.

Figure 4:
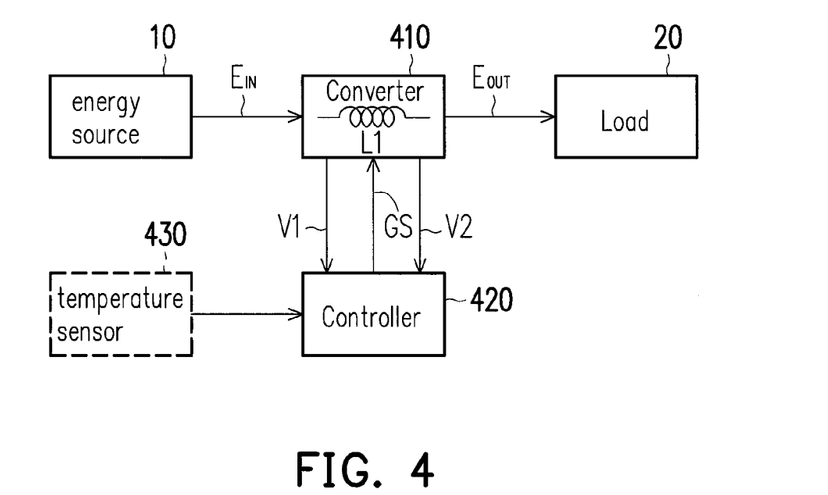
FIG. 4 is a circuit block diagram of a MPPT apparatus according to an embodiment of the disclosure.

FIG. 4 is a circuit block diagram of a MPPT apparatus according to an embodiment of the disclosure. The MPPT apparatus in FIG. 4 includes a converter 410 and a controller 420, in which the converter 410 can be a synchronous DC-DC converter, an asynchronous DC-DC converter or other power converters. For example, the converter 410 can be a boost converter, a buck converter, a buck-boost converter, a flyback converter, a SEPIC converter, a Cúk converter or other converters by using an inductor L1 to perform a power conversion operation.

Figure 5:
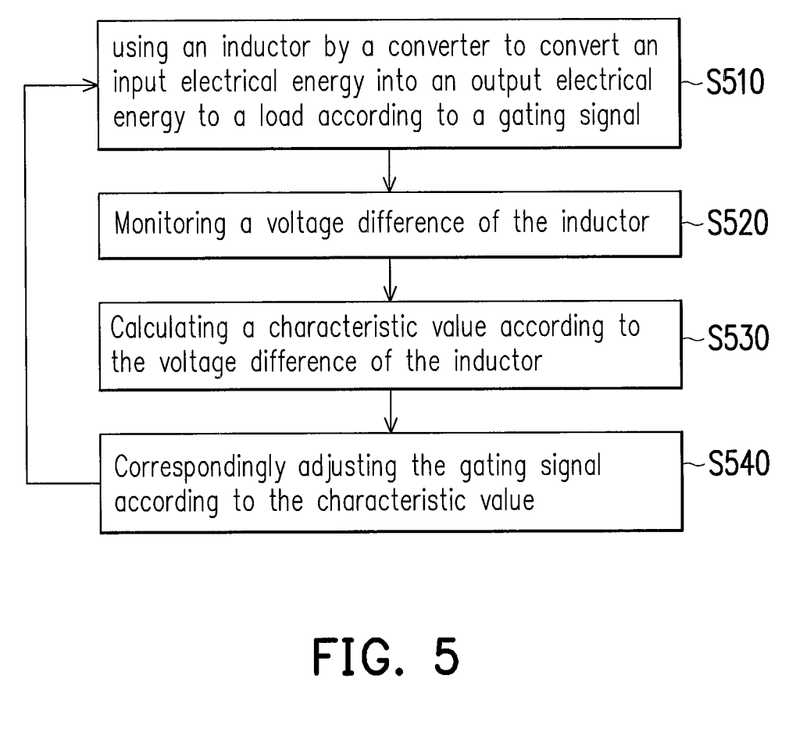
FIG. 5 is a schematic flow chart of a MPPT method according to an embodiment of the disclosure.

FIG. 5 is a schematic flow chart of a MPPT method according to an embodiment of the disclosure. Referring to FIGS. 4 and 5, in step S510, the converter 410 can use the inductor L1 inside the converter 410 to perform a power conversion operation according to a gating signal GS of the controller 420 so as to convert an input electrical energy $E_{IN}$ supplied by the energy source 10 into an output electrical energy $E_{OUT}$ to the load 20. The load 20 can be a resistive load, a capacitive load or an inductive load. For example, the converter 410 herein can use the output electrical energy $E_{OUT}$ to charge a battery.

The controller 420 is coupled to the converter 410 to provide the gating signal GS. The controller 420 monitors the voltage difference of the inductor L1 inside the converter 410 through detecting a first voltage V1 and a second voltage V2 of the converter 410 (step S520), in which the first voltage V1 and the second voltage V2 can be voltages at any two points on the internal power path of the converter 410. In other embodiments, the first voltage V1 and the second voltage V2 can be, for example, the voltages of both ends of the inductor L1 inside the converter 410. In the embodiment, the first voltage V1 can be the voltage of the input electrical energy $E_{IN}$ and the second voltage V2 can be the voltage of the output electrical energy $E_{OUT}$.

The controller 420 calculates a characteristic value according to the voltage difference of the inductor L1 (step S530) and correspondingly adjusts the gating signal GS according to the characteristic value (step S540) so as to track the power of the input electrical energy $E_{IN}$ provided by the energy source 10. The controller 420 can adopt a pulse width modulation (PWM) scheme, a pulse skip modulation (PSM) scheme, a pulse frequency modulation (PFM) scheme, a $\Sigma$-$\Delta$ modulation (sigma-delta modulation, SDM) scheme or a burst modulation scheme to adjust the gating signal GS. The gating signal GS can correspondingly include a PWM signal, a PSM signal, a PFM signal, a SDM signal or a burst modulator signal. The controller 420 and the converter 410 can be operated in discontinue current mode (DCM) or continue current mode (CCM).

Figure 6:
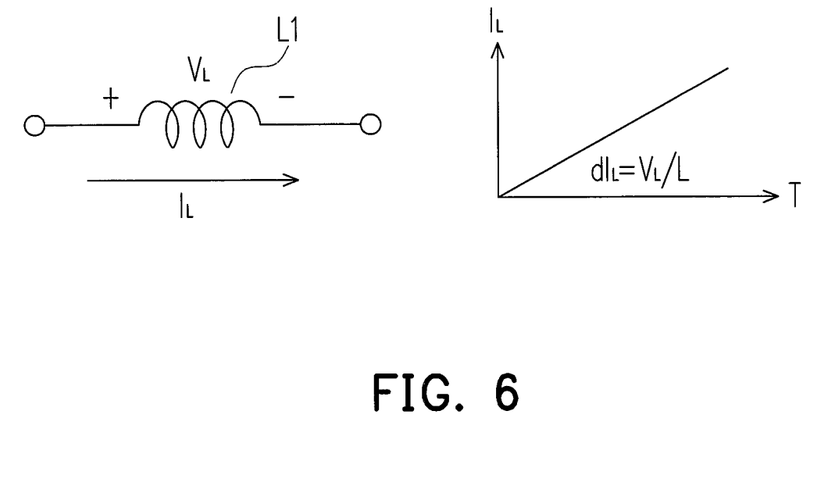
FIG. 6 is a schematic diagram illustrating a current characteristic curve of an inductor.

The characteristic value can be whatever a voltage, a current or a power in response to the input electrical energy $E_{IN}$. In some embodiment, the characteristic value, for example, includes the current of the input electrical energy $E_{IN}$, the power of the input electrical energy $E_{IN}$, the current of the inductor L1, the current of the output electrical energy $E_{OUT}$ or the power of the output electrical energy $E_{OUT}$. In the embodiment, the characteristic value is the current of the inductor L1 inside the converter 410. FIG. 6 is a schematic diagram illustrating a current characteristic curve of the inductor L1 inside the converter 410 of FIG. 4. In the right part of FIG. 6, the abscissa represents time T and the ordinate represents current $I_L$ of the inductor L1. The controller 420 can calculate the current $I_L$ of the inductor L1 according to the voltage $V_L$ across the two ends of the inductor L1, the inductance L of the inductor L1 and the time T through formula (1):

$$dI_L = (1/L) \int V_L dt \qquad \text{formula (1)}$$

Figure 7:
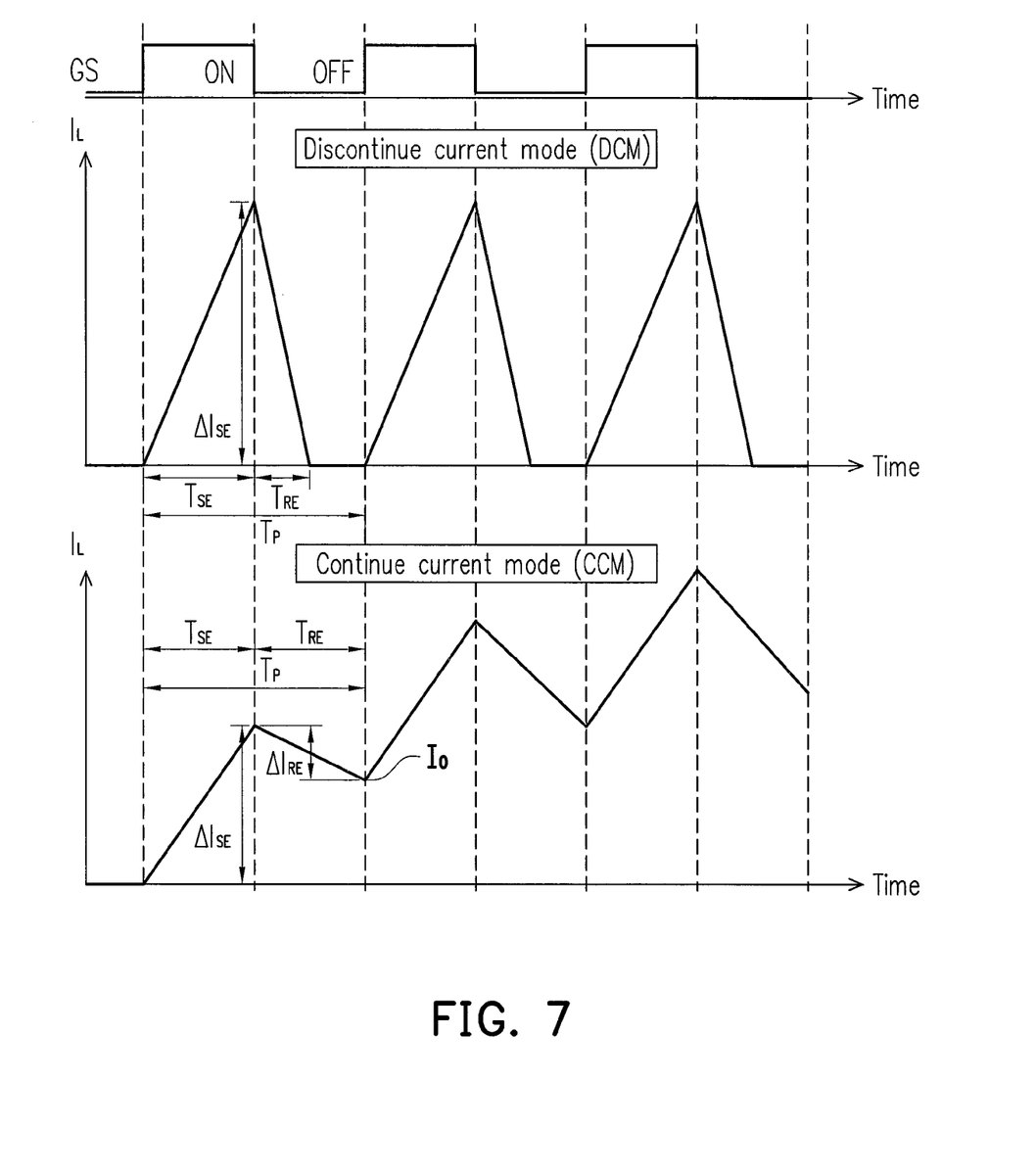
FIG. 7 is a diagram showing the calculating for the inductor inside the converter in FIG. 4 respectively operated in a discontinuous current mode (DCM) and a continuous current mode (CCM).

FIG. 7 is a diagram showing the calculating for the inductor inside the converter 410 in FIG. 4 respectively operated in a discontinuous current mode (DCM) and a continuous current mode (CCM). The upper part of FIG. 7 shows the waveform timing of the gating signal GS, in which the abscissa represents the time and the ordinate represents the amplitude of the gating signal GS. The middle part of FIG. 7 shows the current waveform of the inductor L1 operated in DCM, in which the abscissa represents the time and the ordinate represents the current $I_L$ of the inductor L1. In DCM, first, the controller 420 calculates a current variation $\Delta I_{SE}$ of the inductor L1 in an energy-storing duration $T_{SE}$ according to the voltage $V_L$, across the two ends of the inductor L1 and the energy-storing duration $T_{SE}$ of the inductor L1; then, the controller 420 calculates an energy-releasing duration $T_{RE}$; finally, the controller 420 calculates an average current $I_{AVG}$, an output current $I_O$ and a power of the inductor L1 according to $\Delta I_{SE}$, $T_{SE}$, $T_{RE}$ and the period $T_P$ of the gating signal GS. The information of the average current $I_{AVG}$, the output current $I_O$ and/or the power of the inductor L1 serve as the characteristic value, by which the controller 420 can perform MPPT of the input electrical energy $E_{IN}$.

The lower part of FIG. 7 shows the current waveform timing of the inductance L operated in CCM, in which the abscissa represents the time and the ordinate represents the current $I_L$ of the inductor L1. In CCM, first, the controller 420 calculates the current variation $\Delta I_{SE}$ of the inductor L1 according to the voltage $V_L$ across the two ends of the inductor L1 and the energy-storing duration $T_{SE}$ of the inductor L1; then, the controller 420 calculates the current variation $\Delta I_{RE}$ of the inductor L1 in the energy-releasing duration $T_{RE}$ according to the energy-releasing duration $T_{RE}$ so as to obtain an initial current $I_0$ of the inductance L in the next period $T_P$; Finally, in the next period $T_P$, the controller 420 calculates the average current $I_{AVG}$ or the power of the inductance L from $\Delta I_{SE}$, $\Delta I_{RE}$ and $I_O$. The information of the average current $I_{AVG}$ or the power of the inductance L herein serves as the characteristic value, by which the controller 420 can perform MPPT of the input electrical energy $E_{IN}$.

Figure 8:
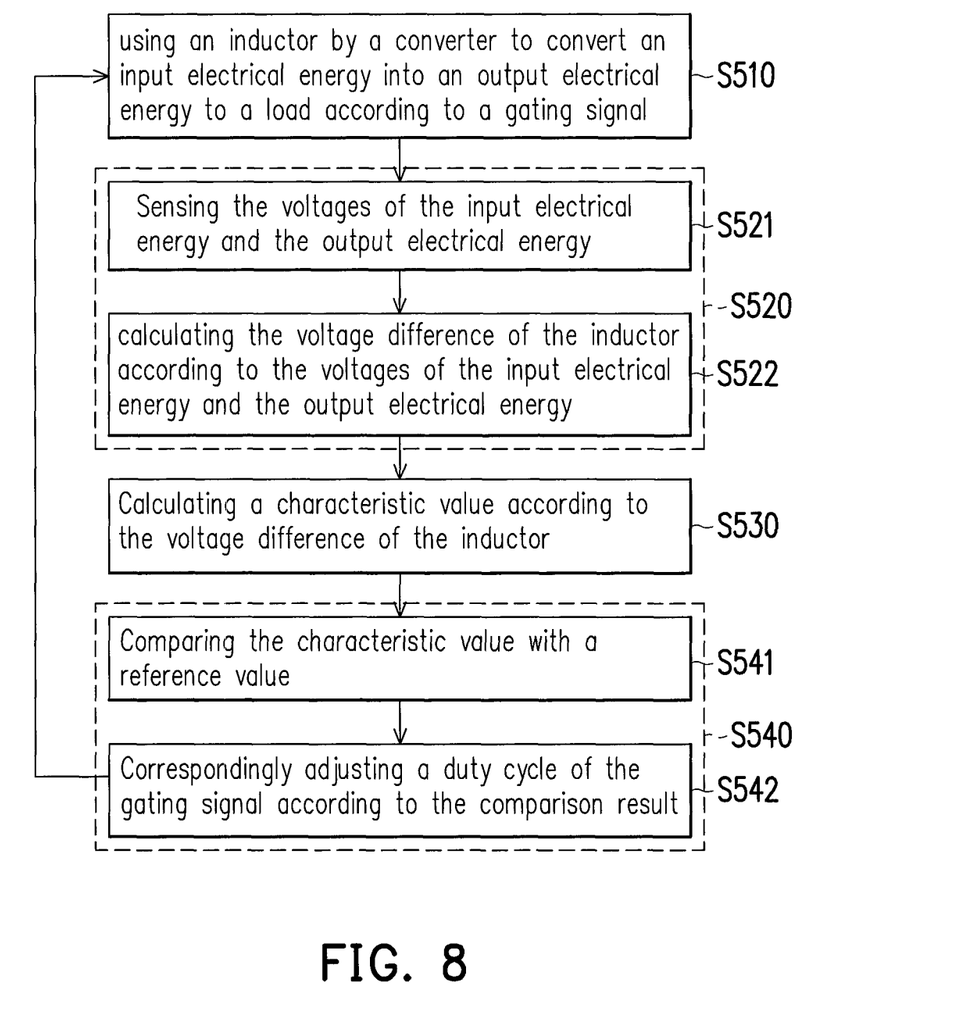
FIG. 8 is a schematic flow chart of a MPPT method according to another embodiment of the disclosure.

FIG. 8 is a schematic flow chart of a MPPT method according to another embodiment of the disclosure. The flowchart of FIG. 8 can be understood referring to the depiction of FIG. 5. In the embodiment, step S520 includes two sub steps S521 and S522, while step S540 includes two sub steps S541 and S542. Referring to FIGS. 4 and 8, in step S521, the controller 420 can sense the voltage of the input electrical energy $E_{IN}$ provided by the energy source 10 and the voltage serves as the first voltage V1, and can sense the voltage of the output electrical energy $E_{OUT}$ provided by the converter 410 and the voltage serves as the second voltage V2. In step S522, the controller 420 calculates the voltage difference of the inductor L1 according to the first voltage V1 of the input electrical energy $E_{IN}$ and the second voltage V2 of the output electrical energy $E_{OUT}$.

After calculating the characteristic value according to the voltage difference of the inductor L1 in step S530, the controller 420 compares the characteristic value with a reference value to obtain a comparison result (step S541). According to the comparison result, the controller 420 accordingly adjusts the duty cycle of the gating signal GS (step S542).

Figure 9:
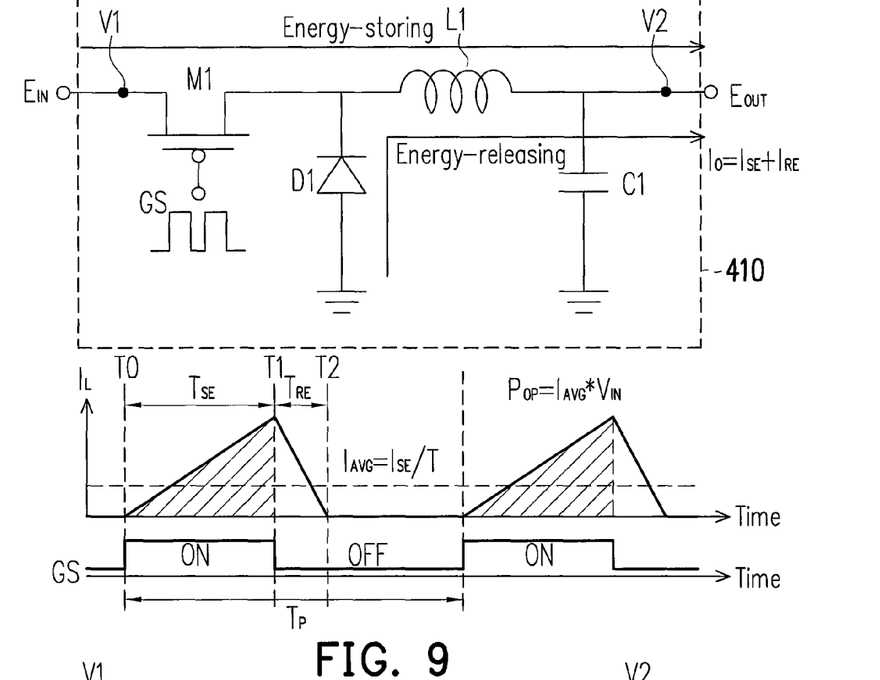
FIG. 9 is a circuit diagram of a buck converter according to an embodiment of the disclosure and illustrates a waveform timing for the above-mentioned buck converter operated in the DCM.

In the following exemplary embodiment, the converter 410 is a buck converter. FIG. 9, for example, is a circuit diagram of a buck converter (converter 410) according to an embodiment of the disclosure and illustrates a waveform timing for the above-mentioned buck converter (converter 410) operated in the DCM. In the embodiment of FIG. 9, the controller 420 can detect the voltage of the input electrical energy $E_{IN}$ provided by the energy source 10 to serve as the first voltage V1 shown by FIG. 4 and detect the voltage of the output electrical energy $E_{OUT}$ of the converter 410 to serve as the second voltage V2 shown by FIG. 4.

Referring to FIGS. 4 and 9, a power switch M1 is controlled by the gating signal GS and operated according to the duty cycle of the gating signal GS. The power switch M1 divides a power conversion into an inductance energy-storing operation and an inductance energy-releasing operation. In the energy-storing duration, the power switch M1 is turned on and the current of the input electrical energy $E_{IN}$ at the time can pass through the power switch M1 to be stored in the inductor L1 and a capacitor C1; in the energy-releasing duration, the power switch M1 is cut off and the inductor L1 at the time provides a current flowing to the capacitor C1 and the load 20 from a diode D1.

The lower part of FIG. 9 illustrates a waveform timing of the gating signal GS, in which the abscissa represents the time and the ordinate represents the amplitude of the gating signal GS. The middle part of FIG. 9 shows the current waveform of the inductor L1 operated in DCM, in which the abscissa represents the time and the ordinate represents the current $I_L$ of the inductor L1. When the inductor L1 is operated in the energy-storing duration, the controller 420 calculates the voltage difference $V_L$ of the inductor L1 by formula (2), in which $V_{IN}$ represents the voltage of the input electrical energy $E_{IN}$, $V_{M1}$ represents the conductive voltage drop of power switch M1, and $V_{OUT}$ represents the voltage of the output electrical energy $E_{OUT}$. In some embodiments, the conductive voltage drop $V_{M1}$ of the power switch M1 can be a constant value. In the other embodiments, the conductive voltage drop $V_{M1}$ of the power switch M1 may be affected by temperature so that the controller 420 can obtain the conductive voltage drop $V_{M1}$ of the power switch M1 through a lookup table method according to the present operation temperature or obtain an approximation of the conductive voltage drop $V_{M1}$ of the power switch M1 by the following simple formula:

$$V_L = V_{IN} - V_{M1} - V_{OUT} \qquad \text{formula (2)}$$

After obtaining the voltage difference $V_L$ of the inductor L1, the controller 420 can calculate formula (1) to obtain the current $I_L$ of the inductor L1, as shown by formula (3). In formula (3), L is the inductance of the inductor L1, and T1 and T0 are respectively a upper time limitation and a lower time limitation:

$$dI_L = \frac{1}{L}\int_{T0}^{T1}(V_L)dt \qquad \text{formula (3)}$$
$$= \frac{(V_L)(T1-T0)}{L}$$
$$= \frac{(V_{IN}-V_{M1}-V_{OUT})(T1-T0)}{L}$$

After obtaining the current $dI_L$, the controller 420 calculates formula (4) to obtain the current $I_{SE}$ of the inductor L1 in the energy-storing duration $T_{SE}$. In formula (4), $I_0$ represents the current of the inductor L1 at the time T0. Since the converter 410 at the time is operated in DCM, the initial current $I_0$ of the inductor L1 at the time T0 is zero. The energy-storing duration $T_{SE}$ is the duty cycle of the gating signal GS (i.e., the power switch M1 is turned on at the time).

$$I_{SE} = I_0 + dI_L \qquad \text{formula (4)}$$
$$= \frac{(V_{IN}-V_{M1}-V_{OUT})(T1-T0)}{L}$$
$$= \frac{(V_{IN}-V_{M1}-V_{OUT})T_{SE}}{L}$$

At the time, in some embodiments, the controller 420 can take the current $I_{SE}$ as the characteristic value of step S530. In the other embodiments, the controller 420 can further calculate formula (5) to obtain the average power $P_{AVG}$. In formula (5), $I_{AVG}$ is the average current of the input electrical energy $E_{IN}$, $T_{SE}$ represents the length of the energy-storing duration, and $T_P$ represents the length of the operation cycle of the converter 410 (defined by the gating signal GS). Thus, the controller 420 can take the average power $P_{AVG}$ as the characteristic value of step S530.

$$P_{AVG} = V_{IN} \times I_{AVG} \qquad \text{formula (5)}$$
$$= V_{IN}\left[\frac{I_{SE} \times T_{SE}}{T_P}\right]$$

Figure 10:
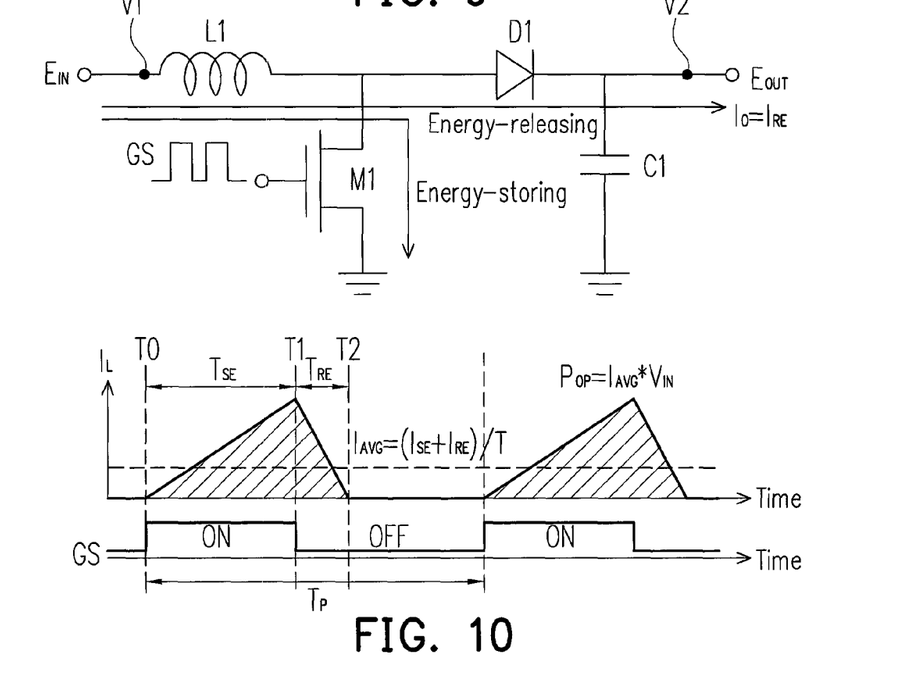
FIG. 10 is a circuit diagram of a boost converter according to another embodiment of the disclosure and illustrates a waveform timing for the above-mentioned boost converter operated in the DCM.

In the following exemplary embodiment, the converter 410 is a boost converter. FIG. 10, for example, is a circuit diagram of a boost converter (converter 410) according to another embodiment of the disclosure and illustrates a waveform timing for the above-mentioned boost converter (converter 410) operated in the DCM. In the embodiment of FIG. 10, the controller 420 can detect the voltage of the input electrical energy $E_{IN}$ provided by the energy source 10 to serve as the first voltage V1 as shown by FIG. 4 and detect the voltage of the output electrical energy $E_{OUT}$ of the converter 410 to serve as the second voltage V2 as shown by FIG. 4.

Referring to FIGS. 4 and 10, a power switch M1 is controlled by the gating signal GS and operated according to the duty cycle of the gating signal GS. The power switch M1 divides a power conversion into an inductance energy-storing operation and an inductance energy-releasing operation. En the energy-storing duration, the power switch M1 is turned on and the current of the input electrical energy $E_{IN}$ at the time can be stored in the inductor L1; in the energy-releasing duration, the power switch M1 is cut off and the inductor L1 at the time provides a current flowing to the capacitor C1 and the load 20 from a diode D1.

The lower part of FIG. 10 illustrates a waveform timing of the gating signal GS, in which the abscissa represents the time and the ordinate represents the amplitude of the gating signal GS. The middle part of FIG. 10 shows the current waveform of the inductor L1 operated in DCM, in which the abscissa represents the time and the ordinate represents the current $I_L$ of the inductor L1. When the inductor L1 is operated in the energy-storing duration, the controller 420 calculates the voltage difference $V_L$ of the inductor L1 by formula (6), in which $V_{IN}$ represents the voltage of the input electrical energy $E_{IN}$ and $V_{M1}$ represents the conductive voltage drop of power switch M1. In some embodiments, the conductive voltage drop $V_{M1}$ of the power switch M1 can be a constant value. In the other embodiments, the conductive voltage drop $V_{M1}$ of the power switch M1 may be affected by temperature so that the controller 420 can obtain the conductive voltage drop $V_{M1}$ of the power switch M1 through a lookup table method according to the present operation temperature or obtain an approximation of the conductive voltage drop $V_{M1}$ of the power switch M1 by the following simple formula:

$$V_L = V_{IN} - V_{M1} \qquad \text{formula (6)}$$

After obtaining the voltage difference $V_L$ of the inductor L1 in the energy-storing duration $T_{SE}$, the controller 420 can calculate formula (1) to obtain the current $I_L$ of the inductor L1, as shown by formula (7). In formula (7), L is the inductance of the inductor L1 and T1 and T0 respectively represent the upper time limit and the lower time limit of the energy-storing duration.

$$dI_L = \frac{1}{L}\int_{T0}^{T1}(V_L)dt \qquad \text{formula (7)}$$
$$= \frac{(V_L)(T1-T0)}{L}$$
$$= \frac{(V_{IN}-V_{M1})(T1-T0)}{L}$$

After obtaining the current $dI_L$, the controller 420 calculates formula (8) to obtain the current $I_{SE}$ of the inductor L1 in the energy-storing duration $T_{SE}$. In formula (4), $I_0$ represents the current of the inductor L1 at the time T0. Since the converter 410 at the time is operated in DCM, the initial current $I_0$ of the inductor L1 at the time T0 is zero. The energy-storing duration $T_{SE}$ is the duty cycle of the gating signal GS (i.e., the power switch M1 is turned on at the time).

$$I_{SE} = I_0 + dI_L \qquad \text{formula (8)}$$
$$= \frac{(V_{IN}-V_{M1})(T1-T0)}{L}$$
$$= \frac{(V_{IN}-V_{M1})T_{SE}}{L}$$

When the inductor L1 is operated in the energy-releasing duration $T_{RE}$, the controller 420 calculates formula (9) so as to calculate the voltage difference $V_L$ of the inductor L1 in the energy-releasing duration $T_{RE}$. In formula (9), $V_{OUT}$ represents the voltage of the output electrical energy $E_{OUT}$, $V_{D1}$ represents the forward voltage drop of the diode D1 and $V_{IN}$ represents the voltage of the input electrical energy E. In some embodiments, the forward voltage drop $V_{D1}$ of the diode D1 can be a constant value. In the other embodiments, the forward voltage drop $V_{D1}$ of the diode D1 may be affected by temperature so that the controller 420 can obtain the forward voltage drop $V_{D1}$ of the diode D1 through a lookup table method according to the present operation temperature or obtain an approximation of the forward voltage drop $V_{D1}$ of the diode D1 by the following simple formula:

$$V_L = V_{OUT} + V_{D1} - V_{IN} \qquad \text{formula (9)}$$

After obtaining the voltage difference $V_L$ of the inductor L1 in the energy-releasing duration $T_{RE}$, the controller 420 can calculate formula (1) to obtain the current $dI_L'$ of the inductor L1 in the energy-releasing duration $T_{RE}$ and the energy-releasing duration $T_{RE}$, as shown by formula (10). In formula (10), T1 and T0 respectively represent the upper time limit and the lower time limit of the energy-releasing duration $T_{RE}$.

$$dI_L' = \frac{1}{L}\int_{T1}^{T2}(V_L)dt \quad \text{formula (10)}$$
$$= \frac{(V_L)(T2-T1)}{L}$$
$$= \frac{(V_{OUT}+V_{D1}-V_{IN})(T2-T1)}{L}$$
$$= \frac{(V_{IN})(T1)}{L}$$

therefore, $T_{RE} = T2 - T1 = \frac{V_{IN} \times T1}{(V_{OUT}+V_{D1}-V_{IN})}$ At the time, the controller 420 can further calculate formula (11) to obtain the average power $P_{AVG}$. In formula (11), $I_{AVG}$ is the average current of the input electrical energy $E_{IN}$, $T_{SE}$ represents the length of the energy-storing duration of the inductor L1, $T_{RE}$ represents the length of the energy-releasing duration of the inductor L1 and $T_P$ represents the length of the operation cycle of the converter 410 (defined by the gating signal GS). Thus, the controller 420 can take the average power $P_{AVG}$ as the characteristic value of step S530.

$$P_{AVG} = V_{IN} \times I_{AVG} \quad \text{formula (11)}$$
$$= V_{IN}\left[\frac{I_{SE} \times (T_{SE}+T_{RE})}{T_P}\right]$$

Figure 11:
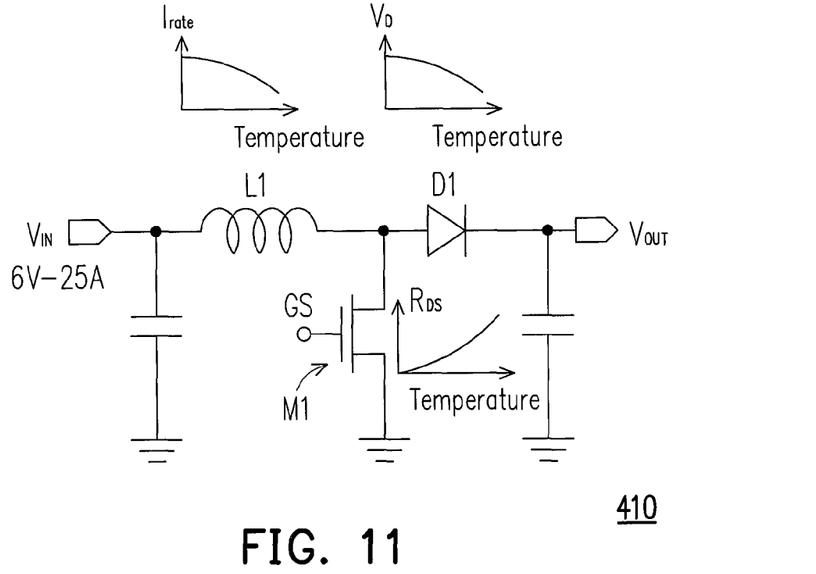
FIG. 11 is a diagram illustrating the relationship between the element characteristic inside a boost converter and the temperature.

All elements of the converter 410 are sensitive on temperature. In the following exemplary embodiment, the converter 410 is a boost converter. FIG. 11 is a diagram illustrating the relationship between the element characteristic inside a boost converter and the temperature. The rated current $I_{rate}$ of the inductor L1 in the boost converter would be reduced along with the rising temperature. Meanwhile, the conductive impedance $R_{DS}$ of the power switch M1 is increased along with the rising temperature, and the conductive voltage $V_D$ of the diode D1 is reduced along with the rising temperature as well. In short, the temperature effect would affect the working condition of the converter 410 during running. In this regard, the MPPT apparatus of FIG. 4 can optionally employ a temperature sensor 430. The temperature sensor 430 is coupled to the controller 420 for sensing the operation temperature of the converter 410 and providing the sensing result to the controller 420.

Figure 12:
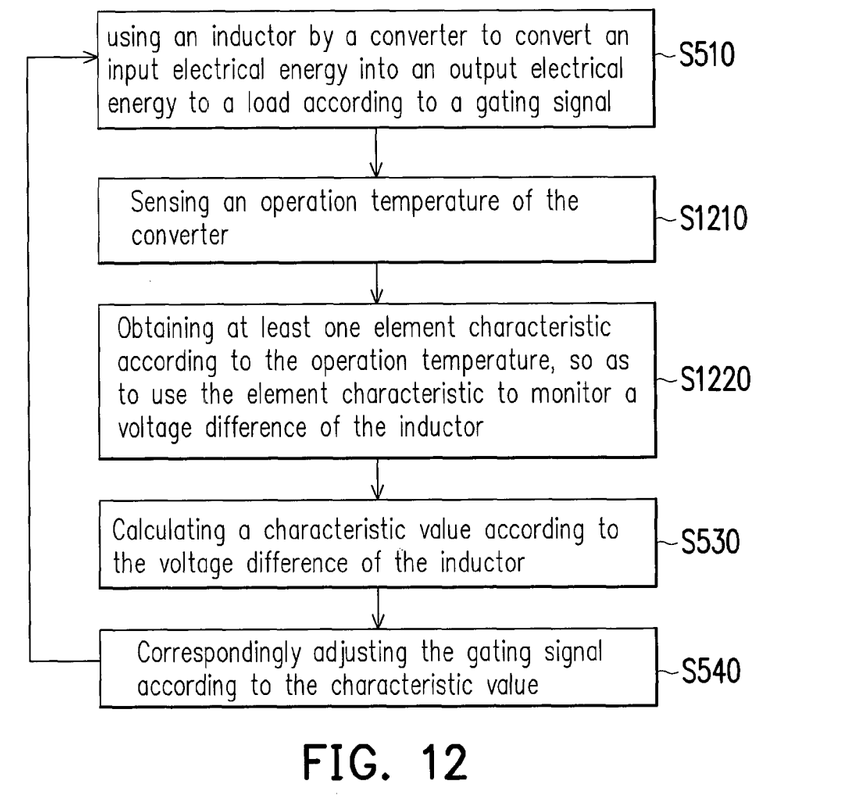
FIG. 12 is a schematic flow chart of a MPPT method according to yet another embodiment of the disclosure.

FIG. 12 is a schematic flow chart of a MPPT method according to yet another embodiment of the disclosure. The embodiment of FIG. 12 can be understood referring to the depiction of FIG. 5. Referring to FIGS. 4 and 12, after finishing step S510, the step S1210 is performed, so that the controller 420 can sense the operation temperature of the converter 410 through the temperature sensor 430. In step S1220, the controller 420 can obtain at least one element characteristic of the converter 410 according to the operation temperature of the converter 410. The controller 420 in step S1220 can detect the first voltage V1 and the second voltage V2 of the converter 410. By using the at least one element characteristic and the first voltage V1 and the second voltage V2, the controller 420 in step S1220 can monitor the voltage difference $V_L$ of the inductor L1 inside the converter 410.

For example, the controller 420 in step S1220 can use temperature, and through the formula calculation method or the lookup table method, to decide/revise the voltage $V_L$ across the two ends of the inductor L1, or to decide/revise the conductive voltage drop $V_{M1}$ of the power switch M1, or to decide/revise the forward voltage drop $V_{D1}$ of the diode D1, or to decide/revise the characteristics of other elements of the converter 410. The controller 420 can use the at least one element characteristic, the voltage $V_{IN}$ of the input electrical energy $E_{IN}$ and the voltage $V_{OUT}$ of the output electrical energy $E_{OUT}$ in step S1220 to monitor the voltage difference $V_L$ of the inductor L1 inside the converter 410.

Taking formula (2) as an example, the controller 420 in step S1220 can perform lookup table operation according to the operation temperature sensed by the temperature sensor 430 (or perform formula calculation) to obtain the conductive voltage drop $V_{M1}$ of the power switch M1 in formula (2) (the element characteristic). By using the conductive voltage drop $V_{M1}$ of the power switch M1, the voltage $V_{IN}$ of the input electrical energy and the voltage $V_{OUT}$ of the output electrical energy, the controller 420 in step S1220 can calculate formula (2) to obtain the voltage difference $V_L$ of the inductor L1.

Taking formula (6) as an example, the controller 420 in step S1220 can perform lookup table operation according to the operation temperature sensed by the temperature sensor 430 (or perform formula calculation) to obtain the conductive voltage drop $V_{M1}$, of the power switch M1 in formula (6) (the element characteristic). By using the conductive voltage drop $V_{M1}$ of the power switch M1 and the voltage $V_{IN}$ of the input electrical energy, the controller 420 in step S1220 can calculate formula (6) to obtain the voltage difference $V_L$ of the inductor L1.

Taking formula (9) as an example, the controller 420 in step S1220 can perform lookup table operation according to the operation temperature sensed by the temperature sensor 430 (or perform formula calculation) to obtain the forward voltage drop $V_{D1}$ of the diode D1 in formula (9) (the element characteristic). By using the forward voltage drop $V_{D1}$ of the diode D1, the voltage $V_{IN}$ of the input electrical energy and the voltage $V_{OUT}$ of the output electrical energy, the controller 420 in step S1220 can calculate formula (9) to obtain the voltage difference $V_L$ of the inductor L1.

In step S530, the controller 420 can calculate the characteristic value according to the voltage difference $V_L$ of the inductor L1. For example, the controller 420 in step S530 can calculate the average current $I_{AVG}$ from the duty cycle of the gating signal GS, and then, the controller 420 obtains the present operation power $P_{OP}$ through the calculations of the average current $I_{AVG}$ and the voltage of the input electrical energy $E_{IN}$ or the voltage of the output electrical energy $E_{OUT}$, and the obtained present operation power $P_{OP}$ serves as the characteristic value.

Taking formula (3) as an example, the controller 420 in step S530 can calculate a current $dI_L$ according to the voltage difference $V_L$ of the inductor L1 so as to obtain the characteristic value. The characteristic value herein can be the voltage difference $V_L$ of the inductor L1 shown by formula (2), or the current $I_L$ of the inductance L shown by formula (3), or the current $I_{SE}$ of the inductor L1 in the energy-storing duration $T_{SE}$ as shown by formula (4), and or the average power $P_{AVG}$ shown by formula (5) since all the physical quantities can be in response to the state of the input electrical energy $E_{IN}$.

Taking formula (7) as an example, the controller 420 in step S530 can calculate a current $dI_L$ according to the voltage difference $V_L$ of the inductor L1 so as to obtain the characteristic value. The characteristic value herein can be the voltage difference $V_L$ of the inductor L1 in the energy-storing duration $T_{SE}$ shown by formula (6), or the current $I_L$ of the inductance L in the energy-storing duration $T_{SE}$ shown by formula (7), and or the current $I_{SE}$ of the inductor L1 in the energy-storing duration $T_{SE}$ as shown by formula (8) since all the physical quantities can be in response to the state of the input electrical energy E.

Taking formula (10) as an example, the controller 420 in step S530 can calculate a current $dI_L$ according to the voltage difference $V_L$ of the inductor L1 so as to obtain the characteristic value. The characteristic value herein can be the voltage difference $V_L$ of the inductor L1 in the energy-releasing duration $T_{RE}$ shown by formula (9), or the current $I_L$ of the inductance L in the energy-releasing duration $T_{RE}$ shown by formula (10), and or the average power $P_{AVG}$ shown by formula (11) since all the physical quantities can be in response to the state of the input electrical energy $E_{IN}$.

After step S530, the controller 420 performs step S540 so that the controller 420 uses the characteristic value (for example, the present operation power $P_{OP}$ or other values) to judge whether or not the input electrical energy $E_{IN}$ is operated on the MPP. If the input electrical energy $E_{IN}$ is operated not on the MPP, the duty cycle of the gating signal GS needs to be accordingly adjusted. By repeating the above-mentioned steps, until the input electrical energy $E_{IN}$ is operated on the MPP. In this way, the controller 420 of the disclosure can use the input voltage $V_{IN}$ and the output voltage $V_{OUT}$ of the converter 410 and the temperature sensed by the temperature sensor 430 to produce a corresponding gating signal GS through operation to control the switch of the converter 410 for performing the tracking operation of the MPP.

In summary, the MPPT apparatus and the MPPT method in the embodiments of the disclosure can track the output power points of the energy source 10 by monitoring the voltage difference of the inductor L1 inside the converter 410. As a result, the MPPT apparatus and the MPPT method in the embodiments of the disclosure are able to track the power points of the electrical energy 10 without employing additional current sensors.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A maximum power point tracking method, comprising:
    performing a power conversion operation by a converter through an inductor inside the converter according to a gating signal so as to convert an input electrical energy supplied by an energy source into an output electrical energy feeding to a load;
    sensing an operation temperature of the converter;
    obtaining at least one element characteristic according to the operation temperature so as to use the at least one element characteristic to monitor a voltage difference of the inductor;
    calculating a characteristic value according to the voltage difference of the inductor; and
    correspondingly adjusting the gating signal according to the characteristic value so as to track power of the input electrical energy of the energy source.

2. The maximum power point tracking method as claimed in claim 1, wherein the gating signal comprises a pulse width modulation signal.

3. The maximum power point tracking method as claimed in claim 1, wherein the step of adjusting the gating signal adopts a pulse width modulation scheme, a pulse skip modulation scheme, a pulse frequency modulation scheme, a $\Sigma$-$\Delta$ modulation (sigma-delta modulation) scheme or a burst modulation scheme.

4. The maximum power point tracking method as claimed in claim 1, wherein the converter comprises a DC-DC converter.

5. The maximum power point tracking method as claimed in claim 4, wherein the element characteristic comprises a conductive voltage drop of a power switch inside the DC-DC converter or a forward voltage drop of a diode inside the DC-DC converter.

6. The maximum power point tracking method as claimed in claim 1, wherein the converter comprises a boost converter, a buck converter, a buck-boost converter, a flyback converter, a SEPIC converter or a Cúk converter.

7. The maximum power point tracking method as claimed in claim 1, wherein the energy source comprises a photovoltaic cell or a thermoelectric energy.

8. The maximum power point tracking method as claimed in claim 1, wherein the step of monitoring a voltage difference of the inductor comprises:
    sensing voltage of the input electrical energy of the energy source;
    sensing voltage of the output electrical energy of the converter; and
    calculating the voltage difference of the inductor according to the voltage of the input electrical energy and the voltage of the output electrical energy.

9. The maximum power point tracking method as claimed in claim 8, wherein the step of calculating a voltage difference of the inductor comprises:
    when the converter is a buck converter and the inductor is operated in an energy-storing duration, calculating $V_L = V_{IN} - V_{M1} - V_{OUT}$, wherein $V_L$ represents the voltage difference of the inductor, $V_{IN}$ represents the voltage of the input electrical energy, $V_{M1}$ represents a conductive voltage drop of a power switch inside the converter, and $V_{OUT}$ represents the voltage of the output electrical energy.

10. The maximum power point tracking method as claimed in claim 9, wherein the step of calculating a voltage difference of the inductor further comprises:
    performing a lookup table operation or calculating the conductive voltage drop $V_{M1}$ of the power switch according to the operation temperature.

11. The maximum power point tracking method as claimed in claim 8, wherein the step of calculating a voltage difference of the inductor further comprises:
    when the converter is a boost converter and the inductor is operated in an energy-storing duration, calculating $V_L = V_{IN} - V_{M1}$, wherein $V_L$ represents the voltage difference of the inductor, $V_{IN}$ represents the voltage of the input electrical energy, and $V_{M1}$ represents a conductive voltage drop of a power switch inside the converter.

12. The maximum power point tracking method as claimed in claim 11, wherein the step of calculating a voltage difference of the inductor comprises:
    performing a lookup table operation or calculating the conductive voltage drop $V_{M1}$ of the power switch according to the operation temperature.

13. The maximum power point tracking method as claimed in claim 8, wherein the step of calculating a voltage difference of the inductor comprises:

when the converter is a boost converter and the inductor is operated in an energy-releasing duration, calculating $V_L = V_{OUT} + V_{D1} - V_{IN}$, wherein $V_L$ represents the voltage difference of the inductor, $V_{OUT}$ represents the voltage of the output electrical energy, $V_{D1}$ represents a forward voltage drop of a diode inside the converter, and $V_{IN}$ represents the voltage of the input electrical energy.

14. The maximum power point tracking method as claimed in claim 13, wherein the step of calculating a voltage difference of the inductor further comprises:

performing a lookup table operation or calculating the forward voltage drop $V_{D1}$ of the diode according to the operation temperature.

15. The maximum power point tracking method as claimed in claim 1, wherein the characteristic value comprises a current of the input electrical energy, a power of the input electrical energy, a current of the inductor, a current of the output electrical energy or a power of the output electrical energy.

16. The maximum power point tracking method as claimed in claim 1, wherein the step of calculating a characteristic value comprises:

calculating $$dI_L = \frac{1}{L}\int_{T0}^{T1}(V_L)dt = \frac{(V_L)(T1-T0)}{L},$$

wherein $I_L$ represents current of the inductor, L represents inductance of the inductor, T1 and T0 respectively represent an upper time limit and a lower time limit, and $V_L$ represents the voltage difference of the inductor; and calculating $I_{SE} = I_0 + dI_L$, wherein $I_{SE}$ represents the current of the inductor in an energy-storing duration, and $I_0$ represents the current of the inductor at the time T0.

17. The maximum power point tracking method as claimed in claim 16, wherein the characteristic value comprises the current $I_{SE}$.

18. The maximum power point tracking method as claimed in claim 16, wherein the step of calculating a characteristic value further comprises:

calculating an average power $$P_{AVG} = V_{IN} \times I_{AVG} = V_{IN}\left[\frac{I_{SE} \times T_{SE}}{T_P}\right],$$

wherein $V_{IN}$ represents the voltage of the input electrical energy, $I_{AVG}$ represents average current of the input electrical energy, $T_{SE}$ represents length of the energy-storing duration, $T_P$ represents length of an operation cycle of the converter, and the characteristic value comprises the average power $P_{AVG}$.

19. The maximum power point tracking method as claimed in claim 16, wherein the step of calculating a characteristic value further comprises:

calculating an average power $$P_{AVG} = V_{IN} \times I_{AVG} = V_{IN}\left[\frac{I_{SE}(T_{SE} + T_{RE})}{T_P}\right],$$

wherein $V_{IN}$ represents the voltage of the input electrical energy, $I_{AVG}$ represents average current of the input electrical energy, $T_{SE}$ represents length of the energy-storing duration, $T_{RE}$ represents length of an energy-releasing duration of the inductor, $T_P$ represents length of duration of an operation cycle of the converter, and the characteristic value comprises the average power $P_{AVG}$.

20. The maximum power point tracking method as claimed in claim 1, wherein the step of correspondingly adjusting the gating signal according to the characteristic value further comprises:

comparing the characteristic value with a reference value to obtain a comparison result; and correspondingly adjusting a duty cycle of the gating signal according to the comparison result.

21. A maximum power point tracking apparatus, comprising:

a converter, configured to perform a power conversion operation through an inductor inside the converter according to a gating signal so as to convert an input electrical energy supplied by an energy source into an output electrical energy feeding to a load;

a temperature sensor, configured to sense an operation temperature of the converter; and a controller, coupled to the converter to provide the gating signal and coupled to the temperature sensor to obtain the operation temperature, wherein the controller obtains at least one element characteristic according to the operation temperature so as to use the at least one element characteristic to monitor a voltage difference of the inductor, and the controller calculates a characteristic value according to the voltage difference of the inductor and correspondingly adjusts the gating signal according to the characteristic value so as to track power of the input electrical energy of the energy source.

22. The maximum power point tracking apparatus as claimed in claim 21, wherein the gating signal comprises a pulse width modulation signal.

23. The maximum power point tracking apparatus as claimed in claim 21, wherein the controller adopts a pulse width modulation scheme, a pulse skip modulation scheme, a pulse frequency modulation scheme, a Σ-Δ modulation (sigma-delta modulation) scheme or a burst modulation scheme so as to adjust the gating signal.

24. The maximum power point tracking apparatus as claimed in claim 21, wherein the converter comprises a DC-DC converter.

25. The maximum power point tracking apparatus as claimed in claim 24, wherein the element characteristic comprises a conductive voltage drop of a power switch inside the DC-DC converter or a forward voltage drop of a diode inside the DC-DC converter.

26. The maximum power point tracking apparatus as claimed in claim 21, wherein the converter comprises a boost converter, a buck converter, a buck-boost converter, a flyback converter, a SEPIC converter or a Cúk converter.

27. The maximum power point tracking apparatus as claimed in claim 21, wherein the energy source comprises a photovoltaic cell or a thermoelectric energy.

28. The maximum power point tracking apparatus as claimed in claim 21, wherein the controller senses voltage of the input electrical energy of the energy source and senses voltage of the output electrical energy of the converter; and the controller calculates the voltage difference of the inductor according to the voltage of the input electrical energy and the voltage of the output electrical energy.

29. The maximum power point tracking apparatus as claimed in claim 28, wherein when the converter is a buck converter and the inductor is operated in an energy-storing duration, the controller calculates $V_L=V_{IN}-V_{M1}-V_{OUT}$, wherein $V_L$ represents the voltage difference of the inductor, $V_{IN}$ represents the voltage of the input electrical energy, $V_{M1}$ represents a conductive voltage drop of a power switch inside the converter, and $V_{OUT}$ represents the voltage of the output electrical energy.

30. The maximum power point tracking apparatus as claimed in claim 29, wherein the controller performs a lookup table operation or calculates the conductive voltage drop $V_{M1}$ of the power switch according to the operation temperature.

31. The maximum power point tracking apparatus as claimed in claim 28, wherein when the converter is a boost converter and the inductor is operated in an energy-storing duration, the controller calculates $V_L=V_{IN}-V_{M1}$, wherein $V_L$ represents the voltage difference of the inductor, $V_{IN}$ represents the voltage of the input electrical energy, and $V_{M1}$ represents a conductive voltage drop of a power switch inside the converter.

32. The maximum power point tracking apparatus as claimed in claim 31, wherein the controller performs a lookup table operation or calculates the conductive voltage drop $V_{M1}$ of the power switch according to the operation temperature.

33. The maximum power point tracking apparatus as claimed in claim 28, wherein when the converter is a boost converter and the inductor is operated in an energy-releasing duration, the controller calculates $V_L=V_{OUT}+V_{D1}-V_{IN}$, wherein $V_L$ represents the voltage difference of the inductor, $V_{OUT}$ represents the voltage of the output electrical energy, $V_{D1}$ represents a forward voltage drop of a diode inside the converter, and $V_{IN}$ represents the voltage of the input electrical energy.

34. The maximum power point tracking apparatus as claimed in claim 33, wherein the controller performs a lookup table operation or calculates the forward voltage drop $V_{D1}$ of the diode according to the operation temperature.

35. The maximum power point tracking apparatus as claimed in claim 21, wherein the characteristic value comprises a current of the input electrical energy, a power of the input electrical energy, a current of the inductor, a current of the output electrical energy or a power of the output electrical energy.

36. The maximum power point tracking apparatus as claimed in claim 21, wherein the controller calculates $$dI_L = \frac{1}{L}\int_{T0}^{T1}(V_L)dt = \frac{(V_L)(T1-T0)}{L},$$

wherein $I_L$, represents current of the inductor, L represents inductance of the inductor, T1 and T0 respectively represent an upper time limit and a lower time limit, and $V_L$, represents the voltage difference of the inductor; and the controller calculates $I_{SE}=I_0+dI_L$, wherein $I_{SE}$ represents the current of the inductor in an energy-storing duration, and $I_0$ represents the current of the inductor at the time T0.

37. The maximum power point tracking apparatus as claimed in claim 36, wherein the characteristic value comprises the current $I_{SE}$.

38. The maximum power point tracking apparatus as claimed in claim 36, wherein the controller calculates an average power $$P_{AVG} = V_{IN} \times I_{AVG} = V_{IN}\left[\frac{I_{SE} \times T_{SE}}{T_P}\right],$$

wherein $V_{IN}$ represents the voltage of the input electrical energy, $I_{AVG}$ represents average current of the input electrical energy, $T_{SE}$ represents length of the energy-storing duration, $T_P$ represents length of an operation cycle of the converter, and the characteristic value comprises the average power $P_{AVG}$.

39. The maximum power point tracking apparatus as claimed in claim 36, wherein the controller calculates an average power $$P_{AVG} = V_{IN} \times I_{AVG} = V_{IN}\left[\frac{I_{SE}(T_{SE}+T_{RE})}{T_P}\right],$$

wherein $V_{IN}$ represents the voltage of the input electrical energy, $I_{AVG}$ represents average current of the input electrical energy, $T_{SE}$ represents length of the energy-storing duration, $T_{RE}$ represents length of an energy-releasing duration of the inductor, $T_P$ represents length of duration of an operation cycle of the converter, and the characteristic value comprises the average power $P_{AVG}$.

40. The maximum power point tracking apparatus as claimed in claim 21, wherein the controller compares the characteristic value with a reference value to obtain a comparison result; and the controller correspondingly adjusts a duty cycle of the gating signal according to the comparison result.

* * * * *